United States Patent
Frankiw

[11] 3,875,847
[45] Apr. 8, 1975

[54] GEAR CROWNING MACHINE CAM
[75] Inventor: Walter Frankiw, Detroit, Mich.
[73] Assignee: Lear Siegler, Inc., Santa Monica, Calif.
[22] Filed: Apr. 9, 1973
[21] Appl. No.: 349,226

[52] U.S. Cl. .............................................. 90/1.6 R
[51] Int. Cl. ............................................. B23f 19/06
[58] Field of Search ...................... 90/1.4, 1.6 R, 2

[56] References Cited
UNITED STATES PATENTS
| | | | |
|---|---|---|---|
| 2,157,981 | 5/1939 | Drummond | 90/1.6 |
| 2,173,557 | 9/1939 | Hoelscher | 80/17 |
| 2,542,569 | 2/1951 | Praeg | 90/1.6 |

FOREIGN PATENTS OR APPLICATIONS
| | | | |
|---|---|---|---|
| 1,004,367 | 9/1965 | United Kingdom | 90/1.6 |

Primary Examiner—Gil Weidenfeld
Attorney, Agent, or Firm—Whittemore, Hulbert & Belknap

[57] ABSTRACT

Camming means for rocking a gear support table in timed relation to reciprocation comprising a bar having opposed flat surfaces angularly adjustable about an axis perpendicular to the direction of reciprocation of the table. The table carries cam follower means comprising rollers engageable with opposite sides of the bar. Preferably, a pair of rollers are provided at one side and a single roller at the other side of the bar, the single roller being adjustable toward and away from the pair of rollers. Means are provided to support the bar in inclined position to rock the table, or in exact parallelism with the direction of reciprocation to prevent rocking of the table.

3 Claims, 6 Drawing Figures

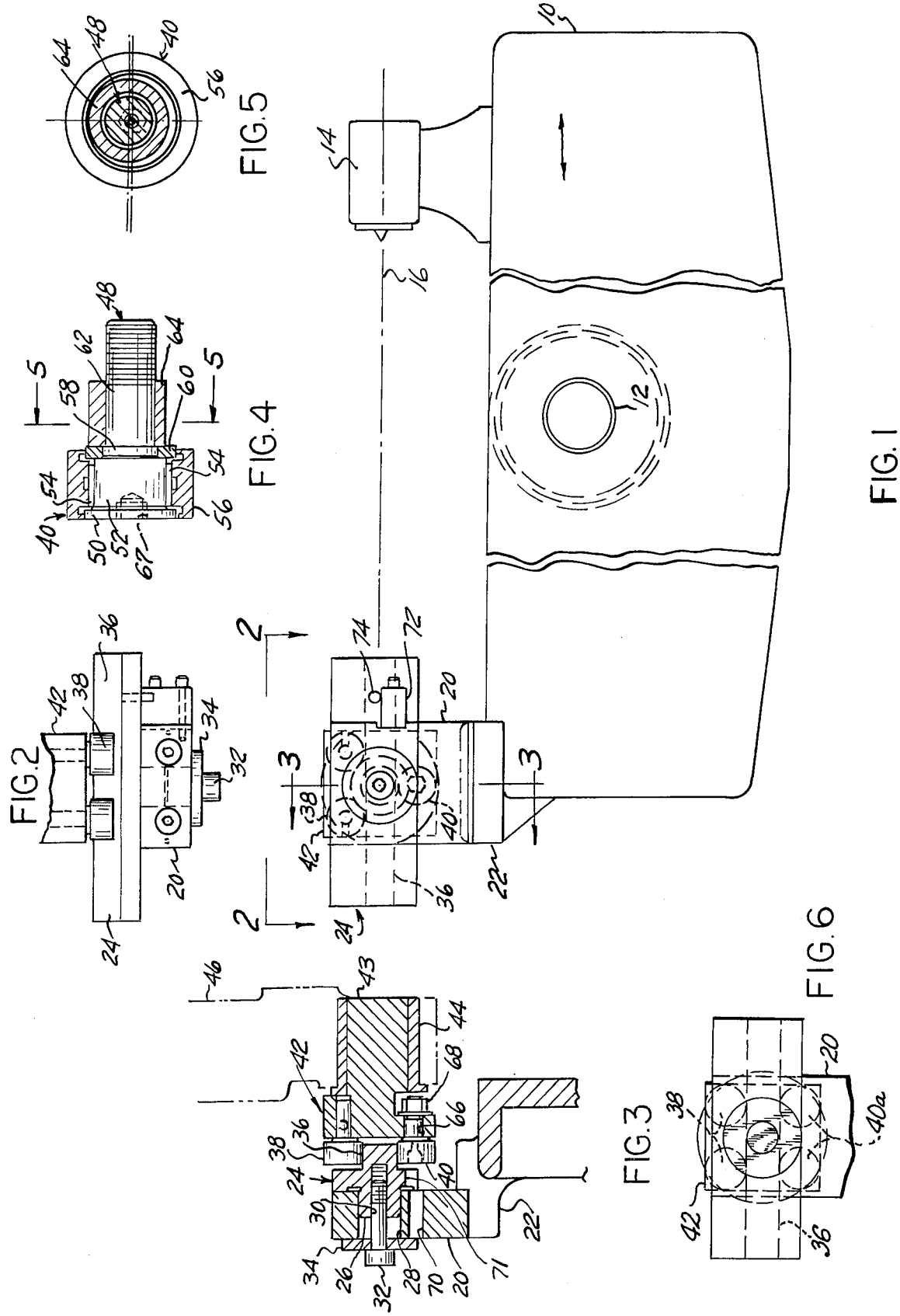

GEAR CROWNING MACHINE CAM

BRIEF SUMMARY OF THE INVENTION

Gear finishing machines have long been known in which the work gear is rotated in pressure contact, usually tight mesh, with a gear-like finishing tool, with the axes of the gear and tool crossed in space. Gear finishing tools have included gear shaving tools and gear honing tools having teeth conjugate to the required form of teeth on the finished gear.

Where the gear and tool have been rotated while the gear is reciprocated in a direction parallel to its axis, the gear teeth have been finished uniformly from end to end. Where, however, a relative rocking motion between gear and tool in timed relation to reciprocation is provided, it has been possible to provide a crowned shape to the teeth of the gear in which the circumferential thickness of the teeth is reduced from the center towards the ends thereof, to provide central bearing or at least to eliminate strict end contact.

A machine for carrying out this crowning operation is shown in Drummond U.S. Pat. No. 2,157,981 in which the work gear is mounted on a table for rocking movement about an axis extending perpendicular to and spaced laterally beneath the axis of the gear. The table is reciprocated in a direction parallel to the position occupied by the axis of the gear in mid-position, and is rocked by camming mechanism including an adjustable cam having a longitudinally extending slot carried by the machine and a cam follower carried by the table which is movable longitudinally in the slot.

The present invention constitutes an improvement in the camming mechanism for effecting rocking movement of the table, and also provides means for retaining the table against rocking.

Instead of employing a follower movable longitudinally in a slot, the camming mechanism comprises a bar portion of an adjustable cam having opposed flat parallel side surfaces. The cam follower comprises a pair of rollers simultaneously engageable with one side of the bar and a single roller engageable with the opposite side of the bar and intermediate the points of engagement of the pair of rollers.

Means are provided for adjusting the single roller toward and away from the pair of rollers so as to eliminate all backlash and to provide precisely guided movement. Accordingly, as the table is reciprocated, a rocking movement is imparted to it in opposite directions from an intermediate position. The rate or amount of rocking movement is determined of course by the inclination of the bar, and the rocking movement usually is arranged to cause the table to move through an intermediate or horizontal position as contact between the gear and tool occurs at the mid-point of the gear teeth.

Since the camming mechanism is adjustable with precise accuracy, it may also be employed as the sole means for maintaining the table against rocking displacement from its intermediate position during reciprocation. In the past it has been the usual practice to disconnect the camming mechanism when no crowning action is desired and to lock the rocking table in adjusted position by means specially provided for that purpose.

BRIEF DESCRIPTION OF THE DRAWING

FIG. 1 is a fragmentary front elevational view of a gear finishing machine with particular disclosure of the camming mechanism.

FIG. 2 is a fragmentary plan view in the direction of the arrows 2—2, FIG. 1.

FIG. 3 is a sectional view on the line 3—3, FIG. 1.

FIG. 4 is a longitudinal sectional view through the adjustable roller.

FIG. 5 is an enlarged sectional view on the line 5—5, FIG. 4.

FIG. 6 is a fragmentary elevational view of a second embodiment of camming mechanism.

DETAILED DESCRIPTION

In FIG. 1 a work table 10 is provided which is connected to a suitable slide (not shown) adapted to reciprocate the table 10 in the direction of the arrows applied thereto. The table 10 is mounted to a slide by a pivot connection indicated at 12, and means later to be described are provided for causing the table to rock from the horizontal position illustrated in FIG. 1 as it is reciprocated.

It will of course be understood that suitable means are provided on the table for supporting a work gear in mesh with a gear-like tool carried by a stationary part of the machine frame. The means for rotatably supporting the work gear comprises a pair of stocks one of which is indicated at 14, and it will be observed that a pair of such stocks will provide for rotation of the work gear about an axis indicated at 16.

In use, the work gear is mounted on the table, usually with the mid-plane of its toothed portion extending vertically and occupying the axis of the pivot support 12. With this arrangement, the reciprocation of the slide and work support is in a direction parallel to the axis of the work gear when the table is in mid-position, and the work gear is rocked in opposite directions from a mid-position as it is reciprocated to either side of the intermediate position.

The present invention relates to the camming mechanism which comprises a cam device including a support block 20 bolted or otherwise secured to an integral bracket 22 provided on the rocking table 10. An elongated cam element 24 is mounted on the block 20, and has a cylindrical projection 26 adapted to extend into a cylindrical opening 28 provided in the block 20. The element 24 has a threaded opening 30 which receives a clamping screw 32, a washer 34 being provided below the head of the screw 32.

The camming element 24 has a camming portion in the form of an elongated bar 36 having parallel flat upper and lower surfaces engageable by a pair of upper rollers 38 and an adjustable lower roller 40 forming a part of a cam follower device cooperating with the cam device.

Vertical adjustment of the lower roller 40 by means presently to be described, permits the upper rollers 38 and the lower roller 40 to engage firmly with the camming bar 36 so that the table 10 is guided with extreme accuracy in its rocking motion, or may be maintained in strictly horizontal position if the cam element 24 is adjusted to a position in which the camming bar portion 36 is precisely horizontal.

The rollers 38 and 40 are provided with roller bearings and are mounted on a rotatable support body 42 having a cylindrical projection 43 which is journaled for rotation as indicated at 44 in a stationary portion of the gear finishing machine indicated in dot and dash lines at 46.

Referring now to FIGS. 4 and 5 there is illustrated the detailed construction of the adjustable roller bearing 40, details of which form no part of the present invention. However, for completeness the details are illustrated and described herein.

The adjustable roller bearing comprises a threaded stud 48 having an enlarged cylindrical portion 50, a cylindrical portion 52 adapted to cooperate with roller bearings 54 received in a cylindrical opening in the roller shell 56, a further reduced portion 58 which receives a washer 60, and a still further reduced portion 62, all cylindrical portions being concentric. The reduced cylindrical portion 62 receives an eccentric bushing 64 which is pressed thereon so as to rotate with the stud in an opening 66 provided in the body 42 as shown. The stud is provided at its enlarged end with a non-circular opening 67 which conveniently may be hexagonal. With this arrangement, the complete assembly illustrated in FIG. 4 is inserted in the opening 66, and the nut 68 is lightly screwed down to the position illustrated in FIG. 3. The block 20 is provided with an opening 70 through which a tool can be inserted into the non-circular opening 66 provided in the stud 48. Similarly, a recess 71 is provided in the lower edge of the camming element 24 to permit passage of the tool. It will be observed from FIG. 1 that the fixed rollers 38 are spaced apart and that the adjustable roller 40 occupies a position at the opposite side of the bar 36 and substantially midway between the rollers 38. Rotation of the stud 48 and the eccentric sleeve or bushing 64 provided thereon will in effect adjust the roller assembly 40 vertically so that it and the upper rollers 38 may be brought into solid engagement with the camming bar portion 36. At this time, while the stud is held against rotation, the nut 68 may be tightened down to lock the adjustable roller 40 in operating position.

The camming element 24 will at this time be held intermediate the support block 20 and the body 42. The washer 34 may then be applied in the operative position, illustrated in FIG. 3, and the elongated screw 32 inserted and tightened to lock the camming element 24 and its camming bar portion 26 in the desired relationship. It will be understood that the roller supporting body 42 is substantially freely rotatable in the opening in the stationary machine frame 46 so that the axes of the rollers 38 occupy a plane parallel to the upper surface of the camming bar 36.

If it is desired to finish a gear without imparting a crown formation to its teeth, the table 10 is fixed in horizontal position so that no rocking occurs as the table is reciprocated in the direction of the arrow shown in FIG. 1. Prior to the present invention, locking of the table in the horizontal intermediate position has usually been accomplished by disconnecting the camming mechanism and by blocking the table against rocking movement, as for example by advancing abutment screws into contact with portions of the table at opposite sides of its pivot mounting 12. The present invention however, provides camming motion of sufficient accuracy so that they may be employed as the sole means for preventing rocking of the table, as well as providing for a predetermined rocking movement thereof. In order to simplify adjustment of the camming mechanism into the position in which the mechanism prevents rocking, the support block 20 is provided with a locating block 72 and a locating pin 74 is provided on the camming element 24, as best illustrated in FIG. 1. With the camming element 24 rotated until the pin 74 engages the locating block 72, the camming element 24 may be clamped in the located position by tightening the screw 32. Thus, as the table 10 is reciprocated, it will be prevented from rotation since the cam bar portion 36 extends exactly horizontal.

Any suitable means may be provided for adjusting the camming element 24 into a desired angular position to determine the amount of crown imparted to a particular gear.

The disclosure of the specific embodiment contained in the foregoing is of a single roller 40 at the opposite side of the bar 36 from a pair of rollers 38. However, it will of course be apparent that instead of providing a single roller 40 to engage the bar 36 at the opposite side of the rollers 38, a pair of rollers independently adjustable in a direction toward and away from the rollers 38 could be provided. Normally, these rollers, if provided in a pair, would respectively oppose the rollers 38 although this is not a specific requirement.

The above described embodiment of the invention is illustrated in FIG. 6 where the parts are generally identified by the reference characters applied in FIG. 1. In this instance however, a pair of rollers, here designated at 40a, are applied in opposed relation to the pair of rollers 38. Moreover, it will be observed that each of the rollers 40a is directly opposed to one of the rollers 38. This arrangement has been found by actual tests to provide substantially greater stability and to insure that reverse tilting on reverse translation of the table duplicates the action of the forward tilting on forward translation. In other words, at each precise point in translation, whether the table is moving forwardly or rearwardly, the rocking position of the table is identical.

I claim:

1. A gear finishing machine comprising a frame, a gear support table mounted on said frame for reciprocation and for rocking movement about an axis perpendicular to the direction of reciprocation, means for contolling rocking of said table comprising cam and cam follower devices operatively connected between said frame and said table, one of said devices being carried by said frame and the other of said devices being carried by said table, said cam device comprising an elongated cam bar having opposed parallel camming surfaces and means for angularly adjusting said bar about an axis parallel to the rocking axis of said table, said cam follower device comprising a first roller means comprising a pair of spaced rollers engageable with one of said parallel surfaces, a second roller means having a single roller engageable with the other of said surfaces intermediate the zones of engagement of said pair of rollers, means for effecting fine adjustment of one of said roller means toward and away from said bar, said means for adjusting said one roller means comprising a support body having an opening of circular cross-section through a portion thereof, mounting stud means including a cylindrical portion having a roller shell rotatable thereon and a portion eccentric to said cylindrical portion angularly adjustable in said opening, said stud means including a threaded end having a clamping nut thereon engageable with one side of the portion of said body having the opening therethrough, and an enlarged head at its opposite end having a noncircular tool engaging recess therein.

2. A machine as defined in claim 1, said recess being disposed adjacent the inner side of said block, said block having an opening therethrough to provide for insertion of an adjusting tool into the recess in the head of said stud.

3. A machine as defined in claim 2, said camming element being provided with a recess to register with the opening through said block to provide for insertion of the tool while said roller support body is in operating position and said camming element is supported on said block with said cam bar portion positioned between said rollers.

* * * * *